US010908944B2

(12) United States Patent
Diestelhorst et al.

(10) Patent No.: US 10,908,944 B2
(45) Date of Patent: Feb. 2, 2021

(54) APPARATUS WITH SHARED TRANSACTIONAL PROCESSING RESOURCE, AND DATA PROCESSING METHOD

(71) Applicant: ARM Limited, Cambridge (GB)

(72) Inventors: Stephan Diestelhorst, Cambridge (GB); Matthew James Horsnell, Cambridge (GB); Guy Larri, Cambridge (GB)

(73) Assignee: ARM LIMITED, Cambridge (GB)

(*) Notice: Subject to any disclaimer, the term of this patent is extended or adjusted under 35 U.S.C. 154(b) by 227 days.

(21) Appl. No.: 15/532,221

(22) PCT Filed: Nov. 24, 2015

(86) PCT No.: PCT/GB2015/053568
§ 371 (c)(1),
(2) Date: Jun. 1, 2017

(87) PCT Pub. No.: WO2016/097679
PCT Pub. Date: Jun. 23, 2016

(65) Prior Publication Data
US 2017/0269960 A1    Sep. 21, 2017

(30) Foreign Application Priority Data

Dec. 19, 2014   (GB) .................................. 1422791.2

(51) Int. Cl.
*G06F 9/455*   (2018.01)
*G06F 9/46*    (2006.01)
*G06F 9/38*    (2018.01)

(52) U.S. Cl.
CPC ............ *G06F 9/467* (2013.01); *G06F 9/3842* (2013.01); *G06F 9/3863* (2013.01)

(58) Field of Classification Search
CPC ...... G06F 9/466; G06F 9/467; G06F 12/0833; G06F 13/28; G06F 9/30043;
(Continued)

(56) References Cited

U.S. PATENT DOCUMENTS 7,739,473 B1 *   6/2010   Nordquist ........... G06F 12/0284
                                                    711/100
7,925,860 B1 *   4/2011   Juffa .................... G06F 9/3455
                                                    712/10

(Continued)

FOREIGN PATENT DOCUMENTS

CN        1492324      4/2004
CN        1726468      1/2006
(Continued)

OTHER PUBLICATIONS

International Search Report for PCT/GB2015/053568, dated May 11, 2016, 6 pages.
(Continued)

*Primary Examiner* — Tuan A Vu
(74) *Attorney, Agent, or Firm* — Nixon & Vanderhye, P.C.

(57) ABSTRACT

An apparatus (2) with multiple processing elements (4, 6, 8) has shared transactional processing resources (10, 50, 75) for supporting processing of transactions, which comprise operations performed speculatively following a transaction start event whose results are committed following a transaction end event. The transactional processing resources may have a significant overhead and sharing these between the processing elements helps reduce energy consumption and circuit area.

15 Claims, 4 Drawing Sheets

(58) Field of Classification Search
CPC .. G06F 12/0284; G06F 9/5027; G06F 9/3455; G06F 9/44; G06F 9/528; G06F 9/3842; G06F 9/3004; G06F 9/3857; G06F 9/3859; G06F 9/3863; G06F 9/3885
See application file for complete search history.

(56) References Cited

U.S. PATENT DOCUMENTS

| | | | |
|---|---|---|---|
| 7,984,248 B2 | 7/2011 | Kottapalli et al. | |
| 8,131,894 B2 | 3/2012 | Cain, III et al. | |
| 8,176,266 B2 | 5/2012 | Kottapalli et al. | |
| 8,429,656 B1* | 4/2013 | Duluk, Jr. | G06F 9/5027 718/102 |
| 8,458,412 B2 | 6/2013 | Kottapalli et al. | |
| 8,739,186 B2 | 5/2014 | Iorio | |
| 9,569,254 B2* | 2/2017 | Agarwal | G06F 9/467 |
| 2006/0161740 A1 | 7/2006 | Kottapalli et al. | |
| 2009/0119667 A1 | 5/2009 | Hou et al. | |
| 2009/0138890 A1 | 5/2009 | Blake et al. | |
| 2009/0182956 A1 | 7/2009 | Caprioli et al. | |
| 2010/0023707 A1* | 1/2010 | Hohmuth | G06F 9/466 711/152 |
| 2010/0138571 A1 | 6/2010 | Cain, III et al. | |
| 2011/0055493 A1 | 3/2011 | Kottapalli et al. | |
| 2011/0252203 A1 | 10/2011 | Kottapalli et al. | |
| 2012/0227045 A1* | 9/2012 | Knauth | G06F 9/3004 718/100 |
| 2013/0111501 A1 | 5/2013 | Iorio | |
| 2013/0205119 A1* | 8/2013 | Rajwar | G06F 9/3842 712/208 |
| 2013/0339975 A1* | 12/2013 | Busaba | G06F 9/44 718/104 |
| 2014/0040567 A1 | 2/2014 | Pohlack et al. | |
| 2014/0068201 A1 | 3/2014 | Fromm | |
| 2015/0127927 A1* | 5/2015 | Paddon | G06F 9/30043 712/225 |
| 2015/0242216 A1* | 8/2015 | Busaba | G06F 9/528 712/218 |
| 2015/0286597 A1* | 10/2015 | Vajapeyam | G06F 13/28 710/308 |
| 2016/0062892 A1* | 3/2016 | Guthrie | G06F 12/0833 711/122 |

FOREIGN PATENT DOCUMENTS

| | | |
|---|---|---|
| CN | 101095113 | 12/2007 |
| CN | 101739298 | 6/2010 |
| CN | 103399894 | 11/2013 |
| CN | 104011682 | 8/2014 |
| WO | WO 2013/186604 | 12/2013 |

OTHER PUBLICATIONS

Written Opinion of the ISA for PCT/G2015/053568, dated May 11, 2016, 12 pages.
Search Report for GB 1422791.2 dated Jun. 19, 2015, 6 pages.
Chinese Office Action dated Mar. 9, 2020, issued in CN 201580066172.1 and English translation (17 pages).
Office Action dated Oct. 21, 2020, issued in Chinese Application No. 201580066172.1 (5 pages).

\* cited by examiner

APPARATUS WITH SHARED TRANSACTIONAL PROCESSING RESOURCE, AND DATA PROCESSING METHOD This application is the U.S. national phase of International Application No. PCT/GB2015/053568 filed Nov. 24, 2015 which designated the U.S. and claims priority to GB Patent Application No. 1422791.2 filed Dec. 19, 2014, the entire contents of each of which are hereby incorporated by reference.

The present technique relates to the field of data processing. More particularly, it relates to processing of transactions.

Some data processing apparatuses may support processing of transactions in which, following a transaction start event, subsequent data processing operations (e.g. data access operations) are performed speculatively following, until a transaction end event occurs when the results of the speculatively performed operations may be committed. If an abort event occurs before the transaction end event, the speculative results can be discarded. This type of processing may be referred to as transactional memory and may be useful for ensuring that a series of operations is completed atomically without interference from other processes. However, processing of transactions may require additional resources to work well, which may cost silicon real estate and power.

Viewed from one aspect, the present technique provides an apparatus comprising:

a plurality of processing elements to perform data processing; and at least one transactional processing resource shared between the plurality of processing elements for supporting processing of transactions, each transaction comprising one or more data processing operations performed speculatively following a transaction start event, for which results of the speculatively performed data processing operations are committed in response to a transaction end event;

wherein said at least one transactional processing resource supports processing of transactions for a maximum of M of the processing elements at a time, where M is less than the number of processing elements.

Viewed from another aspect, the present technique provides an apparatus comprising:

a plurality of processing means for performing data processing; and at least one transactional processing resource means for supporting processing of transactions, each transaction comprising one or more data processing operations performed speculatively following a transaction start event, for which results of the speculatively performed data processing operations are committed in response to a transaction end event;

wherein said at least one transactional processing resource means is shared between the plurality of processing means; and said at least one transactional processing resource means supports processing of transactions for a maximum of M of the processing means at a time, where M is less than the number of processing means.

Viewed from another aspect, the present technique provides a data processing method for an apparatus comprising a plurality of processing elements; the method comprising:

in response to a transaction start event, requesting processing of a transaction using at least one transactional processing resource shared between the plurality of processing elements, wherein said at least one transactional processing resource supports processing of transactions for a maximum of M of the processing elements at a time, where M is less than the number of processing elements; and when said at least one transactional processing resource is available for processing the transaction:

speculatively performing one or more data processing operations following the transaction start event using said at least one transactional processing resource; and committing results of the speculatively performed data processing operations in response to a transaction end event.

Further aspects, features and advantages of the present technique will be apparent from the following description of examples, which is to be read in conjunction with the accompanying drawings, in which.

Figure 1:
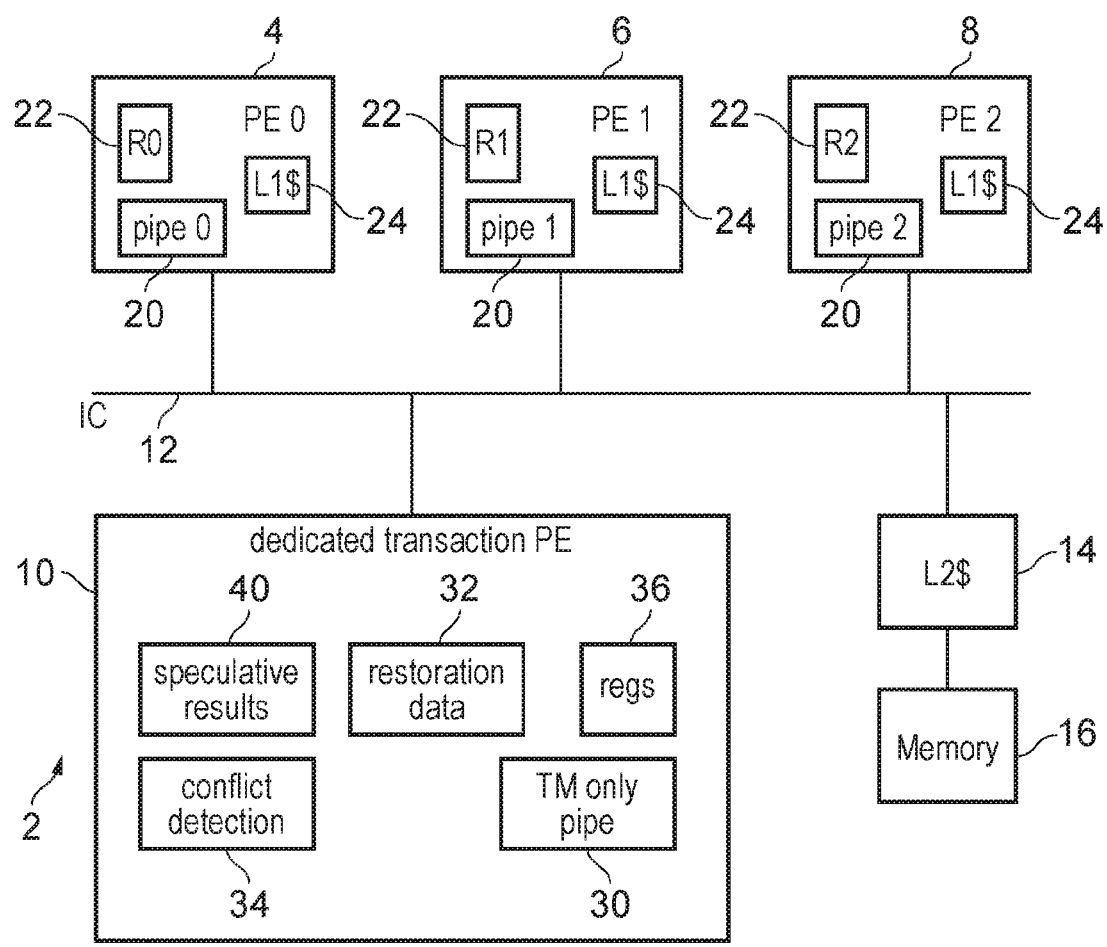
FIG. 1 illustrates an example of an apparatus having a dedicated transaction processing element with resources for processing transactions and a number of general purpose processing elements which do not have resources supporting processing of transactions.

Processing of transactions may require additional transactional processing resources which can be expensive in terms of circuit area and energy consumption. If the transactional processing functionality is only rarely required then the cost of such a feature may not be offset by the benefits. For some processing elements, the overhead of the transactional processing resource can be significant compared to the remaining microarchitecture of the processing element. This overhead can be offset by sharing at least one transactional processing resource between multiple processing elements so that not all of the processing elements can process transactions at once. By avoiding duplication of the transactional processing resource at each processing element, circuit area and power consumption can be reduced. In practice, it may be rare that many of the processing element require transactions to be processed simultaneously and so this approach may have relatively little impact on overall performance while greatly improving area and energy efficiency.

In some implementations the at least one transactional processing resource may only support one of the processing elements processing transactions at any given time, so that the other processing elements cannot process transactions until the first processing element has finished processing transactions. In cases where the transactional processing functionality is only rarely required, this may be enough. In other examples then there may be transactional resource which allows two or more of the processing elements, but less than the total number of processing elements, to process transactions simultaneously. Hence, in general there is a certain maximum number M of processing elements which can simultaneously process transactions, where M is less than N, the total number of processing elements.

While a given processing element has access to the transactional processing resource, it may be processing a single transaction or may simultaneously process multiple transactions which access different data. Hence, while the number of processing elements which can simultaneously process transactions is limited to M, the total number of transactions being processed can still be greater than M if some processing elements are processing multiple transactions.

The shared transactional processing resource may be any of a range of types of resource provided to support the processing elements processing of transactions. Not all of these processing resources need to be shared between processing elements. It is possible for one type of transactional processing resource to be provided separately for each processing element, while another type of transactional processing resource is shared.

In one example the transactional processing resource may be a data store for storing speculative data tracking the results of the speculatively performed data processing operations carried out for transaction. Processing of transactions may require a significant amount of data to be held speculatively until the end of the transaction when the speculative data is committed. There may be an overhead associated with marking data as speculative and with managing the speculative data and subsequently committing the data on completion of a transaction. For example, if the speculative data is stored in a shared cache which also stores non speculative data then additional flags may be needed to distinguish speculative and non-speculative data, and the cache controller may need additional circuitry for ensuing that data marked at speculative is not written back to a higher level cache or memory. The overhead associated with this resource can be reduced by sharing the data store for the speculative data and any associated control logic between multiple processing elements.

Another example of a shared transactional processing resource may be a data store for storing state restoration data which indicates one or more data values to be restored to at least one storage location of the apparatus when an abort event occurs before the transaction end event. The storage location restored using the state restoration data could be a register or a location in a memory or cache. Abort events may occur for various reasons, such as another data attempting to access the same data that has been accessed during the processing of the transaction (a conflict), or if there is insufficient transactional processing resource for continued processing of the transaction. When an abort event occurs, the transaction is halted and the state of the processing element may be restored to the state present when the transaction start event occurred. The aborted transaction may be retried later. The state restoration data store may incur significant overhead especially if multiple transactions are being processed and several versions of the state data need to be backed up. By sharing restoration data storage between several processing elements, circuit area and power consumption can be reduced.

Another example of a shared transactional processing resource may be conflict detection circuitry for detecting a conflict when another data access operation specifies the same address as one of the data access operations of the transaction. For example, the conflict detection circuitry may include data storage for storing addresses of data access operations performed during the transaction, and addresses of other data accesses may be compared against the addresses stored by the conflict detection circuitry. If there is an address match, a conflict can be detected, and this may trigger an abort event as discussed above. Again, the storage for tracking the addresses which have been accessed, and associated circuitry for comparing these addresses against other addresses being accessed, has an area and energy overhead which can be reduced by sharing the conflict detection circuitry between the processing elements.

Another example of the transactional processing resource may be instruction decoder capability for decoding instructions representing the transaction start event and/or transaction end event. While the start and end of a transaction may be signalled in a number of ways, such as by the receipt of an external signal, one convenient way to do this is to provide a transaction start instruction which when executed marks the start of a transaction and a later transaction end instruction marking the end of the transaction. However, this may require instruction set encoding space to be dedicated to the transaction start/end instructions. In many instruction set architectures, instruction encoding space may be at a premium and so providing dedicated transaction start/end instructions may prevent other types of instruction being encoded. Hence, it can be useful to share the instruction set architecture support for the processing of transactions between several elements so that not all of the processing elements need to be able to execute the transaction start instruction or transaction end instruction. If a processing element which does not have the required instruction set architecture support encounters a transaction start instruction, then an exception may be triggered, and processing migrated to a different processing element which does have the capability for processing these instructions.

Hence, there are a number of resources which can be time-shared between multiple processing elements so that not all of the elements can process transactions at once. This enables processing of transactions to be supported in the multi-processing element system without the high overhead associated with providing each element with its own resources.

A mechanism may be provided to query the availability of a transactional processing resource. When a processing element encounters a transaction start instruction representing the transaction start event, it may check whether the at least one transactional processing resource is available for processing with the transaction, and if so then trigger processing of the transaction using the resource. For example, the availability can be checked by sending a message to another processing element or device which has the resource, or by checking an availability flag which indicates whether another processing element is currently using the resource. If the transaction start instruction is not an instruction supported by the processing element which encounters this instruction, then the processing of the transaction can be triggered by raising an abort or exception event and then executing a corresponding exception handler which may migrate processing of the transaction to a different processing element.

Also, there may be a mechanism for offloading transactions or transactional functionality onto other processing elements, which may be implemented in hardware or using a software-based mechanism such as using an exception handler. When offloading transactions to another processing element, state data may be passed between the processing elements so that a second processing element can carry on processing the transaction based on the state of the processing element reached during the previous processing on a first processing element.

There may also be a policy implemented within at least one of the processing elements or within the shared resource to deal with concurrent accesses to a shared transactional resource. For example an arbiter may be provided to arbitrate between requests from several different processing elements for the same resource. For example the arbitration could be in accordance with a round robin policy, or based on priority values associated with each processing element.

If a processing element needs to process a transaction, but the at least one transactional processing resource is not currently available, then there are various actions which the processing element could take. For example the action could include any of the following:

the processing element may simply defer processing of the transaction and wait for the resource to become available.

the processing element may set some control information at the transactional processing resource, which controls the resource to start processing the transaction once it has completed its current transaction. For example there may a transaction queue for queuing pending transactions awaiting use of the resource.

the processing of the transaction may be migrated to another processing element, which may have other resources for processing the transaction.

the processing element may trigger processing of data processing operations of the transaction using a different processing mechanism which does not require the at least one transactional processing resource. For example, transactions may be used to implement exclusive access to certain areas of memory so that a series of operations can complete atomically without any interference from other processes. There may be other mechanisms available for achieving a similar effect, such as using locks to ensure exclusive access to data and then executing non-speculative operations using the locked data. Hence, if the required transactional processing resource is not available then a locking mechanism or another non-transaction-based technique for carrying out the operations may be used.

the processing element may switch to execution of a different thread of processing.

Hence, if the thread which requires a transaction cannot make progress, the processing element may use the time spent waiting for the transactional processing resource to become available to execute another thread.

Hence, there are a number of ways for which a processing element could respond if the resource required for processing a transaction is not available because another processing element is using it.

These types of actions may in some cases be supported in hardware, so that the processing element has some circuitry for triggering one or more of these actions when a required resource is unavailable. In other cases, software may control the processing element (or another processing element) to carry out these actions. For example, if a required resource is not available then the transaction start instruction may trigger an exception condition to be signalled by the processing element and then this may cause an exception handler to be executed in software to control that processing element or a different processing element to perform the predetermined action.

There may be different ways of implementing the shared transactional processing resource. In one example, at least one processing element may be a transaction handling processing element which has the at least one transactional processing resource for supporting processing of transactions. At least one other processing element may not have such transactional processing resource. Hence, if the process or thread executed by the other processing element requires a transaction to be processed, the processing of the transaction can be migrated to the transaction handling processing element.

In some cases the transaction handling processing element may be a general purpose processing element which supports both processing of transactions using the transactional processing resource, and processing of other data processing operations which do not require the transactional processing resource. For example, one of a cluster of processor cores may be equipped the full transactional memory components as well as other general purpose processing resources, while other processing elements may only have the general purpose resources.

Alternatively, the transaction handling processing element may comprise a dedicated transaction handling processing element which is dedicated to processing of transactions, and may not support other types of operations. For example, a dedicated transactional memory accelerator may be provided in a cluster of processing elements, which focuses on executing transactions on behalf of other processing elements of the cluster.

State transfer circuitry (e.g. a bus or interconnect) may be provided for transferring state data to the transaction handling processing element, when processing a transaction on behalf of another processing element. For example, the state data may include a program counter indicating the address of the next instruction to be executed and/or register state data indicating the state of various registers of the other processing element. Once the transaction has completed, the state transfer circuitry may transfer state back from the transaction handling processing element to the other processing element, so that subsequent processing may then continue using the other processing element. In some cases, rather than transferring all the state data at the start of the transaction, it may be possible to only transfer the state data which is actually needed for processing of the transaction. For example, the program counter may be transferred initially, and then as each instruction within a transaction is executed, any required state data for that instruction can be transferred from the other processing element. This can help to reduce the delay associated with state transfer by avoiding time spent transferring data which is not actually used by the transaction. Alternatively, the state data may be transferred at the time of checking availability of the shared resource, to avoid further delay once the resource actually becomes available.

When the transaction is complete, there can be some conditions in which it may be more efficient to suppress the transfer of state data back to the processing element which initiated the request for processing the transaction. For example, the other processing element may require a further transaction to be processed by the transaction handling processing element. By retaining the state data resulting from the previous transaction at the transaction handling processing element, the further transaction can continue without incurring any further overhead associated with state transfer. Also, there may be no further transactions to be processed by the transaction handling processing element. If the subsequent processing for the thread including the transaction could be performed by the transaction handling processing element itself, then processing of the thread may continue on the transaction handling processing element to avoid the delay and energy overhead associated with transferring processing back to the original processing element. This approach may be useful when the transaction handling processing element is a general purpose processing element which also has transaction handling capability.

Hence, in some examples, the speculative execution of operations during processing of transaction takes place at the transaction handling processing element, but may be requested by a thread executing on another processing element.

In other examples, execution of the data processing operations of a transaction may still take place at the requesting processing element, but the processing element may use at least one resource which is shared between a number of processing elements. For example, a shared storage structure may be used for storing tracking data during processing of transactions. This allows at least some of the relatively large data structures required for transaction handling (such as storage that tracks conflict detection, speculative data versioning, or register checkpointing) to only be implemented once or a few times, with the storage being timeshared between the different processing elements. For example, multiplexing circuitry may multiplex requests to access the shared tracking structures from the respective processing elements. With this approach it may be useful to provide a usage flag which indicates whether the shared resources are currently used by a processing element, so that other processing elements can determine whether they can process a transaction.

FIG. 1 schematically illustrates an example of a data processing apparatus 2 comprising a number of processing elements (PEs) 4, 6, 8, 10 which communicate with each other and with a shared level 2 (L2) cache 14 and memory 16 via an interconnect 12. For example, each PE may be a processor core. In this example, three of the PEs 4, 6, 8 are general purpose PEs which have a processing pipeline 20 for carrying out data processing operations, a set of registers 22 for storing data to be processed by the pipeline 20 and a level 1 (L1) cache 24 for storing cached versions of data from the L2 cache 14 or memory 16. The pipeline 20 may for example include a number of pipeline stages such as a fetch stage for fetching instructions from the memory system (L1 cache 10, L2 cache 14 or memory 16), a decode stage for decoding the fetched instructions, a rename stage (if provided) for renaming architectural register specifiers specified by the instructions to physical register specifiers identifying physical registers of the register bank 22, an issue stage for issuing instructions for execution and one or more execute stages for executing the decoded instructions to carry out various processing operations such as arithmetic operations, logical operations, load/store operations, for example. In some cases the pipeline 20 may support out-of-order execution. It will be appreciated that the representation of each PE in FIG. 1 is schematic and that in practice each PE may have many other components not illustrated in FIG. 1 for conciseness. The interconnect 12 may manage coherency between the L1 caches 24 of each PE 4, 6, 8, and data held in the L2 cache 14 or memory 16.

The PE 10 is a dedicated transaction handling PE for processing transactions on request by one of the other PEs, 4, 6, 8. A transaction may comprise a series of processing operations, including data access operations (memory reads or writes), which are performed speculatively following a transaction start instruction marking the start of the transaction. Speculative execution continues until a transaction end instruction is encountered signalling the completion of the transaction. The dedicated transaction handling PE 10 has shared transaction processing resources for processing transactions, including a transaction processing pipeline 30 for performing the speculative processing operations. For example, the transaction processing pipeline 30 may have circuitry supporting decoding and execution of the transaction start and end instructions, which may not be supported by the general purpose pipeline 20 of the PEs 4, 6, 8. Other transactional processing resources include state restoration storage 32, conflict detection circuitry 34, some registers 36 and a speculative result store 40 (which may be a cache for example).

When a transaction start instruction is encountered by one of the PEs 4, 6, 8, then the PE may send a request to the transaction handling PE 10 querying its availability. The PE 4 which initiated the request may transmit some state to the transaction handling PE 10, including a program counter, state from registers 22, and data from L1 cache 24. This state may be transferred either when querying the availability of the transaction handling PE 10, or subsequently once the availability has been confirmed. The register state and data from L1 cache 24 are saved to state restoration storage 32 by the transaction handling PE 10, as a backup version of data which can be restored later if the transaction is aborted.

Reasons for aborts of transactions may vary but a common reason may be a detected conflict between a data access performed for the transaction and another data access. The conflict detection circuitry 34 stores data tracking addresses accessed during the transaction, compare them against memory addresses accessed by other PEs 4, 6, 8 or by other transactions, and signal a conflict if a match is found. If a conflict is detected, the transaction is aborted, and the saved restoration data in storage 32 is used to restore data to various storage locations of the apparatus, which may include the registers 22 or L1 cache 24 of the PE 4, 6, 8 which initiated the transaction, and/or the registers 36 or speculative result store 40 of the transaction handling PE itself.

The state data transferred from the requesting PE which initiated the transaction is also used to initialise the registers 36 and speculative result store 40 so that the transaction handling PE 10 can commence processing of the transaction with the same state data that was held by the requesting PE. During the transaction, the transaction processing pipeline 30 may carry out various processing operations. For some operations, such as arithmetic operations, this may cause values in registers 36 to be updated. For data access operations, speculative values may be loaded to registers 36, placed in the speculative result store 40, or fetched from the L2 cache 14 or memory 16. In the example of FIG. 1 using a dedicated transaction handling PE 10, it may not be necessary to mark data in the speculative result store 40 as speculative since all the data in this data store would be speculative data resulting from processing of a transaction. Speculative data in the speculative result store 40 is prevented from being written back to the L2 cache 14 or memory 16.

Assuming no abort event occurs, the transaction end instruction is eventually encountered, and at this point the speculative state generated during the transaction is committed. Data can be written back to the L2 cache 14 or memory. Also, state data may be transferred from the registers 36 and speculative result store 40 to the registers 22 and L1 cache 24 of the PE 4, 6, 8 which initiated the transaction. Alternatively, this transfer of state data could be suppressed if another transaction from the same PE is to be executed immediately following the previous transaction. If the PE which initiated the transaction has no more transactions to be processed, the transaction handling PE 10 becomes available for processing by another PE.

In this way, the circuit area overhead and energy consumption associated with a various tracking structures and instruction set architecture support provided within the PE 10 for transaction handling can be shared among the PEs 4, 6, 8 so that it is not necessary to provide each PE with this resource.

While processing a transaction for one PE 4, another PE 6, 8 may also need a transaction to be processed. If the transaction handling PE 10 is unavailable, then the other PE 6, 8 may take various actions, which could be triggered either by hardware or by software (e.g. using an exception handler). For example the PE 6, 8 may wait for a specified number of cycles while periodically be checking whether the shared mechanism 10 is available. Also, the PE 6, 8 may signal to the shared transaction handling PE 10 that it requires a transaction to be processed, and when the transaction handling PE 10 becomes available it may then switch to processing the pending transaction. Also, when resource is unavailable the blocked PE 6, 8 could signal to the application being executed that the transaction aborted, and then software may take remedial action such a waiting and retrying the transaction, using another mechanism for concurrency control (such as using locks), or in the case of multithreaded processes, stalling the current thread and executing another thread that does not use the transaction mechanism.

In the example of FIG. 1, the shared transactional processing resources are provided as a dedicated transactional PE 10 which does not provide any other processing capability. For instance the transactional PE 10 may be viewed as a transaction accelerator which executes transactions on behalf of other elements.

Figure 2:
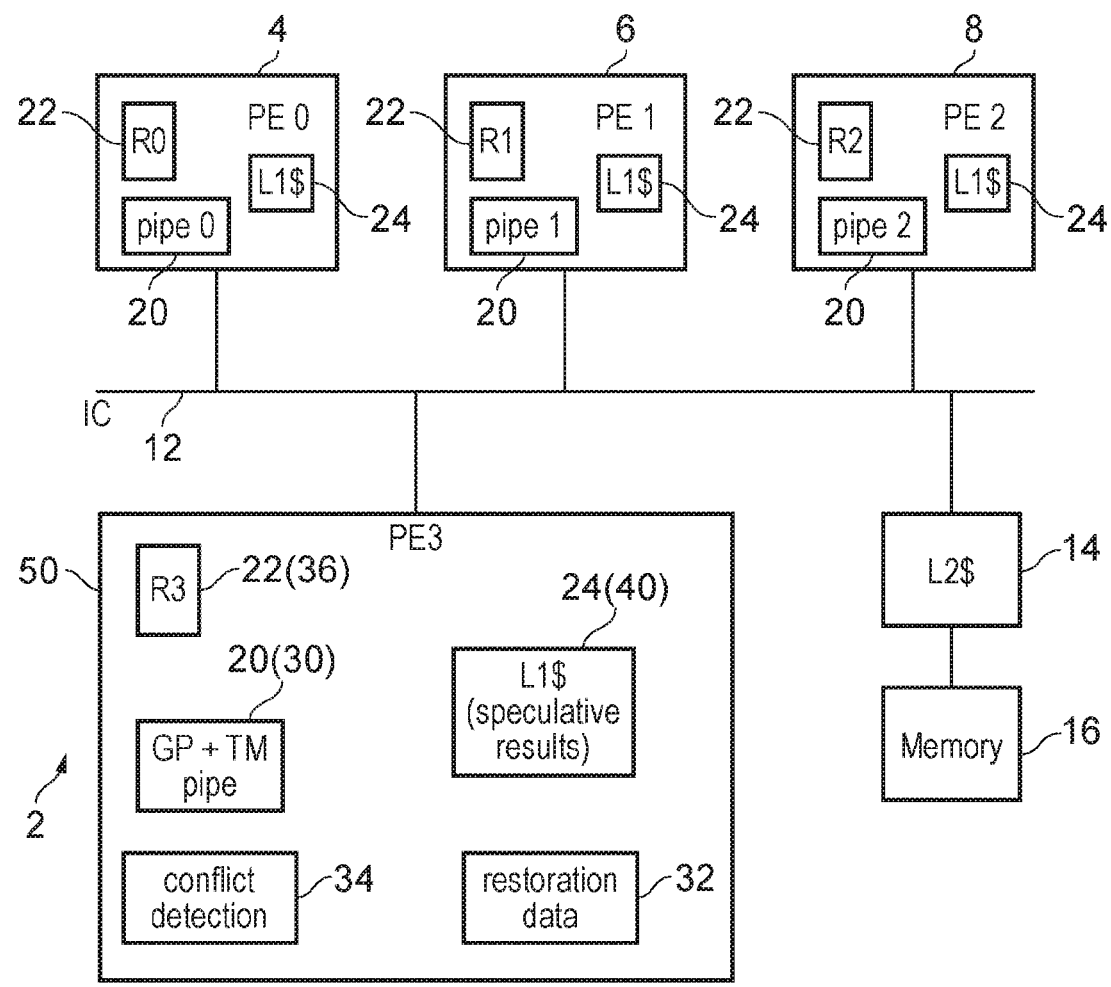
FIG. 2 shows a second example of an apparatus comprising a number of processing elements, one of which supports both general purpose processing and processing of transactions.

FIG. 2 shows another example in which the transaction handling PE 50 also has general purpose processing capability. PEs 4, 6, 8, interconnect 12, L2 cache 14 and memory 16 are the same as in FIG. 1. However, in this example the PE 50 can execute code in the same way as the other PEs 4, 6, 8, including requesting processing of a transaction. The general purpose PE 50 has an L1 cache 24, registers 22 and pipeline 20 in a similar way to PEs 4, 6, 8, but for the PE 50 these also function as the speculative result store 40, transaction registers 36 and transaction pipeline 30 respectively. For example, data in the L1 cache 24 of PE 50 may be tagged with an identifier indicating whether that data is speculative data related to a transaction or non-speculative data related to other operations. Similarly, operations in the pipeline 20 may be flagged as speculative or non-speculative. In addition, the transaction handling PE 50 has additional transaction resources such as the restoration data store 32 and conflict detection circuitry 34. When any of the PEs 4, 6, 8, 50 requires a transaction to be processed, they may check whether the transaction handling resources provided in PE 50 are available, and when available the transaction may be processed in the same way as discussed for FIG. 1 above, except that when the transaction is being processed on behalf of the transaction handling PE 50 itself, there would be no need to transfer state data.

Figure 3:
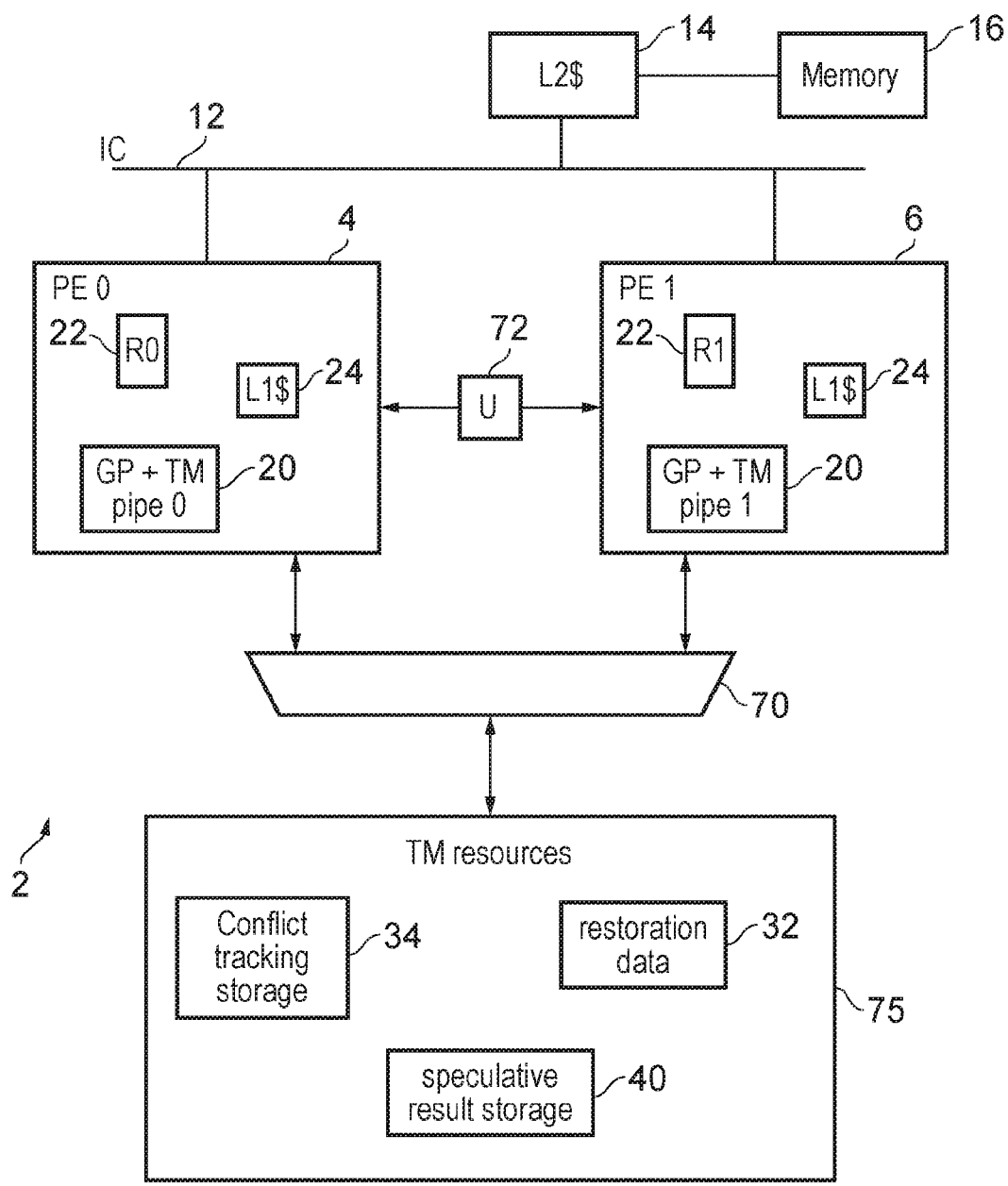
FIG. 3 illustrates an example of an apparatus comprising transactional processing resources shared between multiple processing elements.

FIG. 3 shows a third example of a data processing apparatus 2 having transactional processing resources 75 shared among several PEs 4, 6. This time, the processing pipelines 20 of each PE 4, 6, support both the general purpose processing and processing of transactions, in a similar way to the pipeline 20 of PE 50 of FIG. 2. However, the tracking structures 32, 34, 40 for storing the restoration data, conflict tracking data, and speculative results are shared among the PEs. A multiplexer 70 selects which of the PEs 4, 6 has access to the shared resources 75 at any given time. A usage flag 72 is maintained to indicate whether the resources 75 are currently being used. When one of the PEs 4, 6 encounters a transaction start instruction when the usage flag 72 is clear (indicating that the resources 75 are not in use), then that PE may set the usage flag 72 to prevent other PEs accessing the resources, and then start using the resources 75. On the other hand, if the usage flag 72 is already set, the resources are unavailable, and then one of the remedial actions discussed above can be performed. When using the resources, transactions can be processed by the PE in a similar way to the technique discussed above for the PE 10 of FIG. 1.

Figure 4:
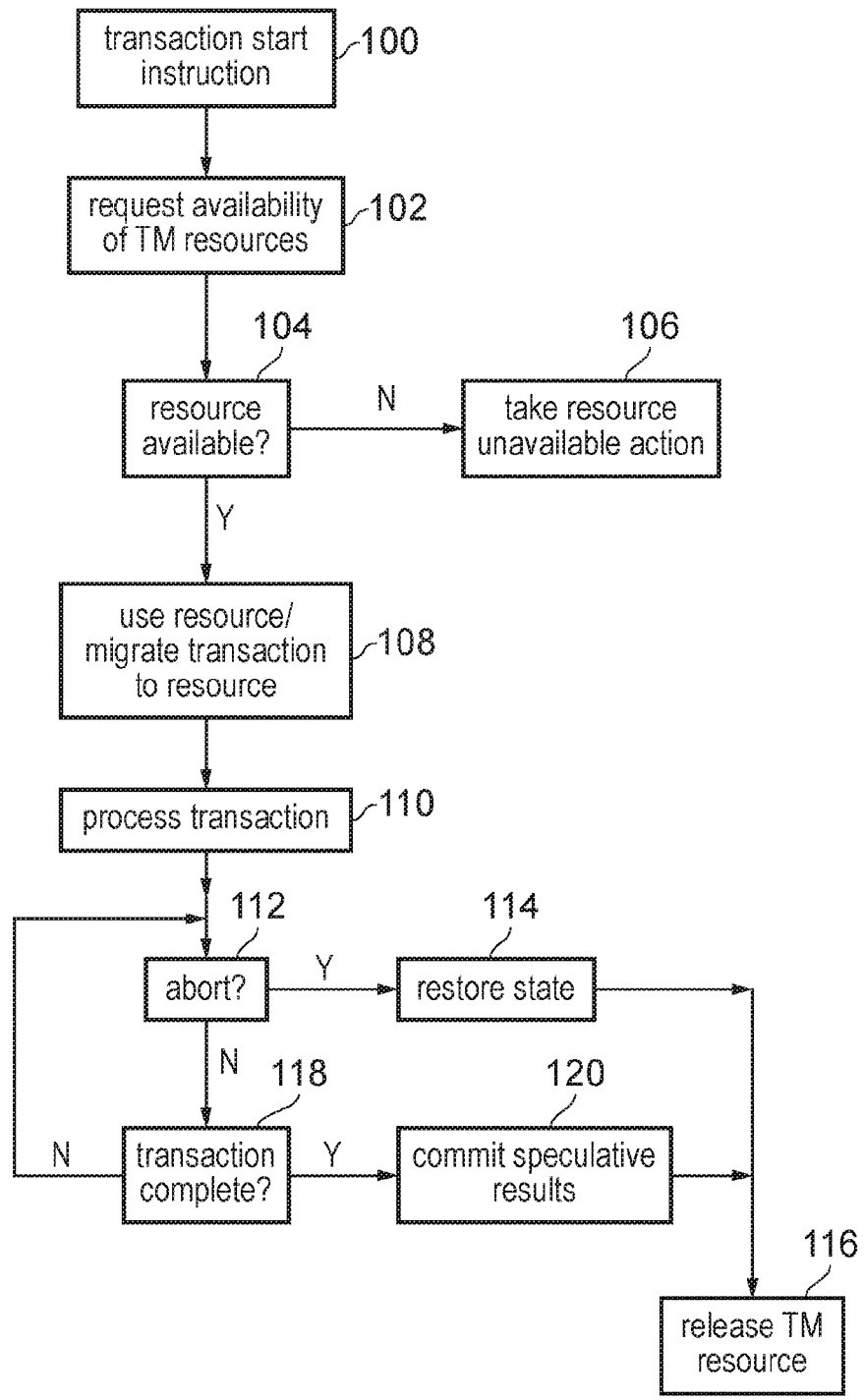
FIG. 4 illustrates a method of processing a transaction using a shared transactional processing resource.

FIG. 4 shows a method of processing a transaction. At step 100, a PE encounters a transaction start instruction. If the PE has support for decoding the transaction start instruction then it may execute the instruction to trigger the subsequent actions. If the decoder support is not provided, an exception may be signalled and an exception handling routine may then trigger the following actions. Either way, at step 102 the PE sends a request to check availability of transactional processing resources, which could be within the same PE or at a remote location. At step 104 it is determined whether the transactional processing resource is available. If not then at step 106 a resource unavailable action is taken (e.g. any of the actions discussed above). If there are several PEs requiring use of the resources, then an arbitration policy may be used to determine which PE should gain access to the resources first.

If the resource is available for a PE, then at step 108 the PE starts to use the resource, either by processing the transaction itself (if the PE has the resource), by transferring processing of the transaction to another PE, or by using the shared tracking structures as in the example of FIG. 3. The usage flag 72 may be set to indicate that the resources are now being used. A backup of state data is stored in the restoration storage 32. At step 110 the transaction is processed, with operations being performed speculatively and the speculative result store 40 updated accordingly. The conflict detection circuitry 34 detects whether there are any address conflicts which may trigger an abort. Abort events could also be triggered if there is not enough transactional processing resource to continue handling the transaction (e.g. if the speculative result store 40 becomes full).

At step 112 it is determined whether there is an abort condition. If so, then at step 114 at least one storage location is restored with state from the restoration data store 32. The restored storage location could be the registers 22 or 36, L1 cache 24 or speculative result store 40. At step 116, the transactional processing resource is then released so that another PE can process transactions.

If no abort event occurs, then at step 118 it is determined whether the transaction end instruction has been encountered. If not, then processing loops through steps 112 to 118 while the transaction continues to be processed. Once the transaction is complete, then at step 120 the speculative results in storage 40 are committed, and then the transactional processing resource is released at step 116. On releasing the resource, the usage flag 72 may be cleared.

In summary, transactional memory requires additional resource to work well, which costs silicon real-estate and power. If such functionality is only rarely required, the cost of such a feature may not be offset by the benefits. In particular in little cores (A7, A53, M-class), overheads of logic for (1) conflict detection, (2) data versioning, (3) register checkpointing and (4) ISA support can be significant over the remaining microarchitecture. In these cases, it is therefore advisable to share the transactional memory logic between multiple cores. This can work for example through having one core in a cluster equipped with the full transactional memory components, having a dedicated transactional memory accelerator in a cluster (a special processor core that focuses on executing transactions on behalf of the general purpose cores in the cluster), or by only implementing the large data-structures required for transactional tracking once and time-share them between the various little cores. This application describes multiple ways of time-sharing the available resources, while not restricting the actual chosen implementation variant. There may be a mechanism to query the availability of a remote transactional executor resource, a mechanism to offload transactions or transactional functionality to the executor, and a policy how to deal with concurrent accesses to a shared transactional resource.

Transactional memory (TM) is a mechanism that groups instructions executed on a CPU into transactions, by way of a start and end marker instruction, often called speculate/commit, or txbegin/txend. These instructions signal to the processor that a transaction is about to start/end and all the following instructions will (not anymore) be part of the transaction. There exist many academic and industry proposals for TM, including commercially available implementations in microprocessors. The instructions that are grouped into transactions flow through the pipeline of the microprocessor as before, but at transaction start, a snapshot of the register and memory state is made. This snapshot of the register & memory state allows rollback of the transaction back to the initial state upon detection of an abort reason. The snapshot comprises two components, a register file snapshot and a mechanism to undo modifications that have been made to memory during the transaction. If the transaction executes the ending instruction, it cannot abort any longer and the snapshot is discarded and the transaction commits.

Reasons for aborts may vary, but the most significant is that of data conflicts between data accessed in one transaction and other memory accesses. Generally, the aim is to disallow any concurrent writes to memory accessed in a transaction, and concurrent reads from data that has been modified in an ongoing transaction. If a transaction performs this conflict detection and aborts upon conflict, this transaction will execute in isolation or atomically from other observers. The advantage is that these transactions can be used in multi-threaded applications where synchronization is important. Due to the dynamic nature, two transactions can execute concurrently (avoiding serial bottlenecks of locks) if they do not conflict with one another. In most cases, actual data conflicts are expected to be rare, so transactional memory can unlock additional performance of multi-threaded applications.

Querying Availability of Transactional Resource

If a processing encounters a transaction-begin instruction, but does not have the required transactional mechanisms, it may query the available shared mechanism whether it is available. This can for example mean sending a packet on the bus to a TM-enabled core in the cluster, the accelerator or bus-connected shared TM resource; or checking an "in-use" signal/field of shared TM logic. If the resource is available, the transaction will acquire the TM-logic (by sending another acquire packet, or setting the in-use bit field) and either send the transaction for remote execution (accelerator/TM-enabled core) or use the shared mechanism directly. In the case of a remote execution unit, the transaction can be sent to the remote core/accelerator by means of sending the register state (including the program counter/instruction pointer) and continuing execution on the remote entity by executing from the transaction entry instruction. In case of a shared transactional memory resource (buffer), the local core will directly use the component (by virtue of a multiplexer, bus etc.) while other users are prevented from using the resource due to the set in-use bit.

Failure to Acquire the Shared Transactional Memory Mechanism

If the shared transactional memory mechanism is in use, the core cannot execute the current transaction. Several mechanisms may be performed as a remedial action:

(1) the processor may wait for a (specified) number of cycles while periodically rechecking if the shared mechanism is available. This would mean that the transaction-begin instruction takes longer to execute.

(2) the core may signal to the application that the transaction has aborted and let software take a remedial action, for example wait and retry, or use another mechanism for concurrency control (grabbing a global lock)

(3) in case of multi-threaded processors, the core may stall the current hardware thread and execute another hardware thread that does not use the transactional mechanism.

Instead of polling in (1), the unsuccessful core/thread may also leave a message with the shared transactional mechanism, so that the shared transactional mechanism will handle the request and wakeup/resume the execution of the transaction as soon as the currently executing transaction completes/aborts.

Usage of the Transactional Mechanism

The instructions in the transaction execute speculatively using the TM mechanisms for conflict detection, and register checkpoint (either on the dedicated TM-core, accelerator, or the shared TM resource from the original core). During this time, other cores in the cluster cannot execute transactions.

Completion of Transactions

If transactions complete, they can release the transactional resource/mechanism and allow other waiting transactions to run. In the case of a shared transactional resource (such as a buffer for versioning of transactional stores), the resource is freed (the in-use bit is unset) and the core that executed the transaction continues execution of the instructions that follow the transaction.

In cases where a TM-enabled core/accelerator is used, the state after the transaction end should eventually be moved back to the core originally executing the instruction stream. This means that again the register state at the end of the transaction (including program counter/instruction pointer, stack pointer etc.) need to be transferred back to the original core.

In cases where a single core executes multiple transactions back to back, or generally, if no other core wants to use the transactional memory mechanism, such a transfer may be costly. It may therefore be advisable to continue execution of the post-transaction stream on the TM-enabled core/the accelerator, if no other request from another core has been logged.

Depending on the handshake (polling vs. leaving a wake-up request), the transaction end may check the mailbox for wake-up requests at transaction end and wake-up one of the waiting threads/cores and signal them the availability of the transactional mechanism.

Alternatives

The messages for querying the availability, acquiring the resource, sending the register state and requesting a wake-up may all be combined into a smaller number of compound messages. For example the core may send a message containing the full register state initially, and if the TM-enabled core/accelerator is free, it will start execution straight away. If the mechanism is in use, instead, it will enqueue the register state and once the currently executing transaction is complete, the TM-core will execute the next pending transaction from the saved register state straight away.

The TM-core/accelerator may decide to immediately retry a failing transaction instead of picking one of the waiting transactions for execution. Such behaviour can be guided by system policy and also past behaviour driving a prediction logic.

As well as the circuit area and energy advantages of sharing resources for processing transactions, in the examples which use a specific transaction handling processing element, the centralized execution of transactions may in some scenarios also have some performance improvements, e.g. due to the reduced number of cache messages.

Implementation Variants

In addition to the three suggested hardware implementations:
(1) TM-enabled full microprocessor core
(2) TM-centric accelerator core (with potentially reduced instruction set)
(3) sharing of transactional memory resources (conflict detection logic, versioning buffer, register snapshot storage) other options exist that offload parts of the policy to software.

A software managed form of such mechanism of (1) and (2) is possible by generating a software visible signal (transaction abort with with special flag) or exception such that an application can perform the migration of the code to a TM-enabled core/accelerator through sending software messages containing the live register/variables and instruction pointer.

Such behaviour is suggested for critical sections in the publication linked above.

Extensions/Flexibility

Instead of providing only a single shared resource/tm mechanism, a larger number of shareable resources may be available (for example, two TM-enabled cores for 8 TM-disabled cores, or two versioning buffers for 8 cores). The present technique easily extends to those cases by checking availability of one of the multiple resources and only going through the stall/abort path if all available shared resources/mechanisms are in use. The benefit is that hardware implementations may allow higher levels of concurrent usage of the TM mechanisms if the anticipated SW use of these has picked up.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

The invention claimed is:

1. An apparatus comprising:
a plurality of processor cores to perform data processing, each processor core having a separate set of registers; and
state restoration storage shared between the plurality of processor cores for supporting processing of transactions, each transaction comprising one or more data processing operations performed speculatively following a transaction start event, for which results of the speculatively performed data processing operations are committed in response to a transaction end event, wherein:
the state restoration storage is configured to store state restoration data indicative of one or more data values to be restored to at least one storage location of the apparatus when an abort even occurs before the transaction end event; and
the state restoration storage is shared between the plurality of processor cores to prevent all of the processor cores using the state restoration storage simultaneously, and limit the number of processor cores simultaneously processing transactions to a maximum of M processor cores, where M is less than the number of processor cores.

2. The apparatus according to claim 1, wherein in response to a transaction start instruction representing the transaction start event, at least one of the processor cores is configured to check whether said state restoration storage is available for processing a transaction, and to trigger processing of the transaction using said state restoration storage state restoration storage is available.

3. The apparatus according to claim 2, wherein when said state restoration storage is not available for processing the transaction, then said at least one of the processor cores is configured to perform a predetermined action, wherein the predetermined action comprises at least one of:
deferring processing of the transaction;
setting control information for controlling said state restoration storage to be used for processing the transaction when said state restoration storage becomes available;
migrating processing of the transaction to another processor core;
triggering processing of the data processing operations of said transaction using a processing mechanism which does not require said state restoration storage; and
switching to execution of a different thread of processing.

4. The apparatus according to claim 3, wherein when said state restoration storage is not available, then said at least one of the processor cores is configured to signal an exception condition for triggering an exception handler to perform the predetermined action.

5. The apparatus according to claim 1, wherein the plurality of processor cores include a transaction handling processor core comprising said state restoration storage.

6. The apparatus according to claim 5, wherein the transaction handling processor core comprises a general purpose processor core supporting processing of transactions and processing of other data processing operations.

7. The apparatus according to claim 5, wherein the transaction handling processor core comprises a dedicated transaction handling processor core dedicated to processing of transactions.

8. The apparatus according to claim 5, wherein another processor core not having said state restoration storage is configured to issue a request for the transaction handling processor core to perform processing of a transaction on behalf of the other processor core.

9. The apparatus according to claim 8, comprising state transfer circuitry to transfer state data from the other processor core to the transaction handling processor core.

10. The apparatus according to claim 8, comprising state transfer circuitry to transfer state data from the transaction handling processor core to the other processor core following completion of said processing of the transaction.

11. The apparatus according to claim 10, wherein the state transfer circuitry is configured to suppress the transfer of the state data to the other processor core when a predetermined condition is satisfied following the completion of said processing of the transaction.

12. The apparatus according to claim 5, wherein a processor core not having said state restoration storage is configured to signal an exception condition on encountering a transaction start instruction representing Said transaction start event.

13. The apparatus according to claim 12, wherein in response to the exception condition, an exception handler executed on one of said plurality of processor cores is configured to trigger processing of the transaction by the transaction handling processor core.

14. The apparatus according to claim 1, comprising a plurality of processor cores capable of performing said processing of transactions;

wherein said state restoration storage has an associated usage flag indicative of whether said state restoration storage is currently being used for processing of a transaction by one of said plurality of processor cores.

15. A data processing method for an apparatus comprising a plurality of processor cores, each processing core having a separate set of registers; the method comprising:
performing data processing using the plurality of processor cores; and
storing state restoration storage shared between the plurality of processor cores for supporting processing of transactions, each transaction comprising one or more data processing operations performed speculatively following a transaction start event, for which results of the speculatively performed data processing operations are committed in response to a transaction end event, wherein:
the state restoration storage is configured to store state restoration data indicative of one or more data values to be restored to at least one storage location of the apparatus when an abort even occurs before the transaction end event; and
the state restoration storage is shared between the plurality of processor cores to prevent all of the processor cores using the state restoration storage simultaneously, and limit the number of processor cores simultaneously processing transactions to a maximum of M processor cores, where M is less than the number of processor cores.

* * * * *